No. 777,487. PATENTED DEC. 13, 1904.
C. H. PELTON.
DISK DRILL.
APPLICATION FILED MAY 2, 1904.
NO MODEL. 2 SHEETS—SHEET 2.
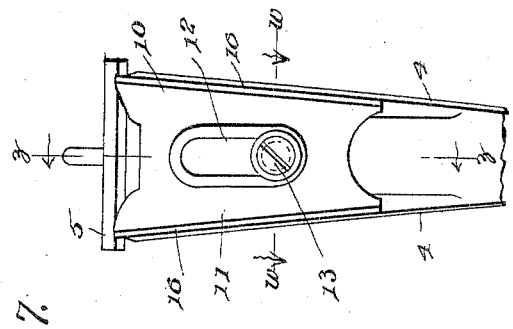
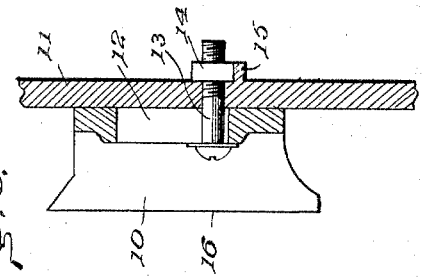
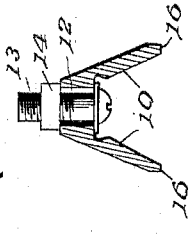
Witnesses
K. Howard Walmsley.
Gertrude D. Young.
Inventor
Charles H. Pelton,
By H. A. Toulmin,
Attorney No. 777,487.                                                        Patented December 13, 1904.

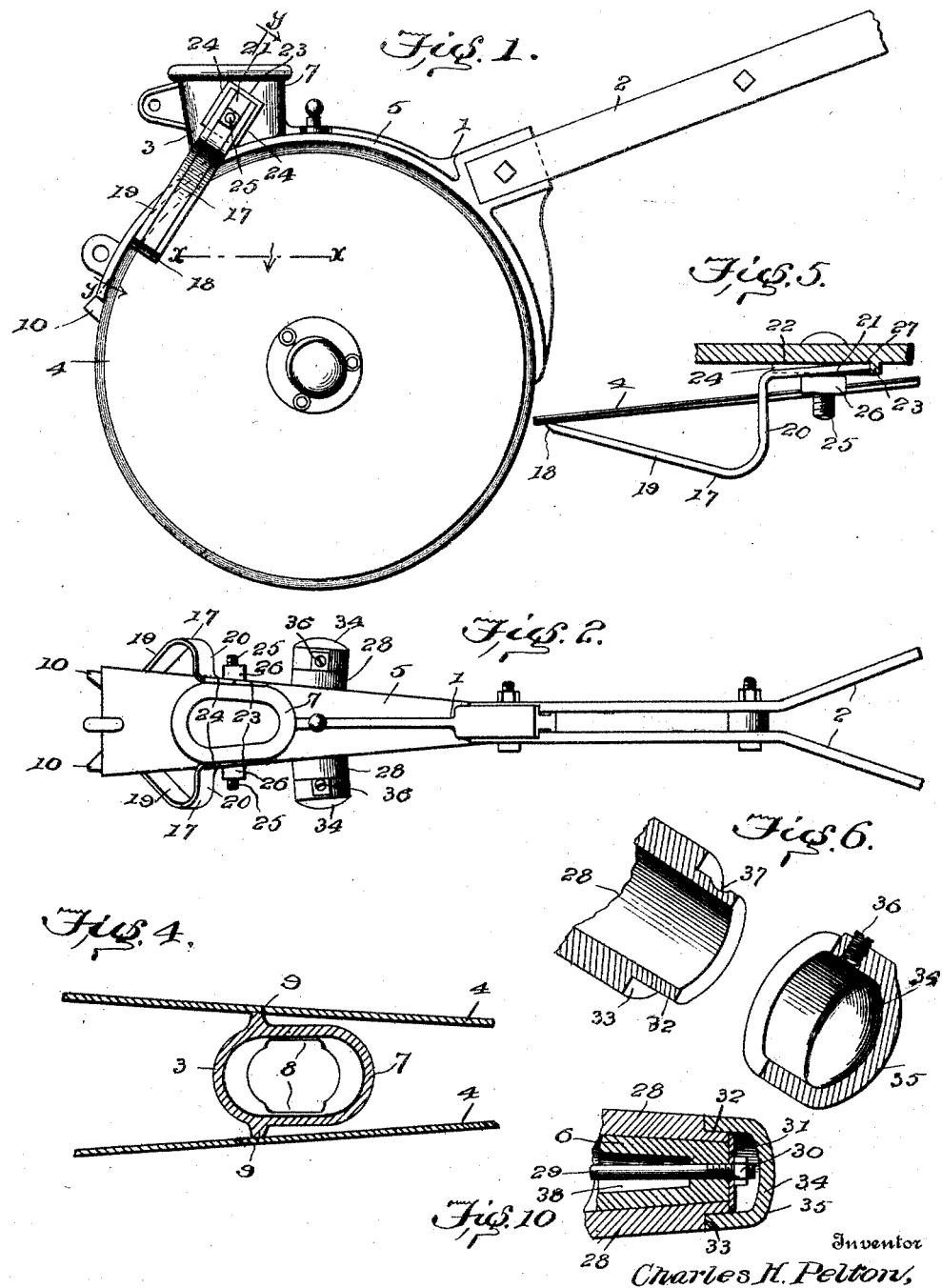

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

DISK DRILL.

SPECIFICATION forming part of Letters Patent No. 777,487, dated December 13, 1904.

Application filed May 2, 1904. Serial No. 205,897. (No model.)

*To all whom it may concern:*

Be it known that I, CHARLES H. PELTON, a citizen of the United States, residing at Springfield, in the county of Clark and State of Ohio, have invented certain new and useful Improvements in Disk Drills, of which the following is a specification, reference being had therein to the accompanying drawings.

This invention relates to disk drills, and more particularly to that class of grain-drills known as "double-disk" drills.

The invention has for its object, first, the provision of means for effectually preventing the clogging of the furrow-opening devices and seed-depositing devices by soil which may adhere to the disks; second, to effectually regulate the contact of the scrapers with both the inner and outer faces of the disks and also to prevent the outside scrapers from being clogged by grass, stubble, or the like; third, to more effectually adapt the seed-conduit carried by the frame or support to receive and coöperate with the seed-tube by which the seed is conveyed from the distributer to said conduit.

To these and other ends the invention consists in certain novel features which I will now proceed to describe and will then particularly point out in the claims.

In the accompanying drawings, Figure 1 is a side elevation of a portion of a grain-drill drag-bar and the furrow-opening and seed-depositing devices carried thereby. Fig. 2 is a plan view of the same. Fig. 3 is an enlarged side elevation with one of the disks removed. Fig. 4 is a detail plan section through the disks and seed-conduit, taken on the line *x x* of Fig. 1 and looking in the direction of the arrows. Fig. 5 is an enlarged detail sectional view taken on the line *y y* of Fig. 1 and looking in the direction of the arrows. Fig. 6 is a detail perspective view in section of the disk-hub and cap separated. Fig. 7 is a detail rear elevation illustrating the relations of the inside scraper and disks. Fig. 8 is a detail view, in vertical section, taken on the line *z z* of Fig. 7 and looking in the direction of the arrows. Fig. 9 is a detail plan section taken on the line *w w* of Fig. 7 and looking in the direction of the arrows; and Fig. 10 is a detail view, in longitudinal section, through one of the disk-bearings.

In the said drawings, 1 indicates a frame or support connected to the drag-bars 2 and carrying the seed tube or conduit 3 and disks 4. Said frame or support is provided with a guard-flange 5, which extends over the upper edges of the disks, so as to cover and protect the same and the space between them to prevent clods, earth, or other material from entering the space between the disks from above. To this end said guard-flange 5 extends from a point in front of the disks about mid-height thereof or in the horizontal plane of their bearings to a corresponding point at the rear of the disks. Said frame 1 is provided with the usual trunnions or spindles 6 for the disks, preferably cast integral with said frame.

7 indicates the conduit, which receives the lower end of the seed-tube, said conduit being preferably cast in one piece with the frame 1 and extending downward in the rear of and below the trunnions 6. This conduit, as is usual, tapers or is of decreasing diameter toward its lower end, being preferably flattened at its sides, as shown. The side walls are cut away or omitted for a considerable distance upward from the lower end of the conduit, as indicated at 8, and this is of material advantage, particularly where seed-tubes are employed composed of coiled wire or other material not readily compressible in a direction transverse to the axis of the tube. Where such seed-tubes are employed, since the vertical movements of the furrow-opener causes the conduit to move up and down relatively to the seed-tubes, by cutting away the side walls of the conduit a considerably greater range of motion of these parts relatively to each other is obtained without causing the lower end of the seed-tube to bind or become wedged in the conduit. The space gained on each side by the omission of the side walls at the lower portion of the conduit prevents such wedging or binding and at the same time lightens the casting.

The seed-tube 7 is provided, near the rear portion of each side thereof, with a longitudinally-extending rib 9, and these ribs bear against the inner faces of the disks 4, as shown more particularly in Fig. 4 of the drawings. These ribs act as scrapers to prevent any earth which may be carried up by the disk and which may escape the action of the inside scraper, hereinafter referred to, from being carried forward between the conduit and disks, so as to clog the spaces between said conduit and disks or the spaces between the disks in front of the conduit. The lower portions of these ribs 9, which lie adjacent to the rear margins of the lateral openings 8 in the sides of the conduit, effectually prevent the soil or trash from entering the conduit through said openings.

10 indicates the inside scraper, which is mounted upon an arm 11, connecting the lower end of the conduit 7 with the rear end of the guard-flange 5. Said scraper is adjustable longitudinally upon this arm 11, so that its movement is approximately radial with respect to the disks. Its adjustment is effected by providing the scraper with a longitudinal slot 12, through which passes a screw-bolt 13, which also passes through an aperture in the arm 11 and receives on the other side of said arm a nut 14, which is prevented from turning with the screw-bolt by means of a stop-lug 15 on the arm 11, against which lug one of its faces fits. The scraper 10 has two scraping edges 16, one for each disk, and said edges converge downwardly or inwardly at an angle corresponding to the angle of the surfaces of the disks upon which said edges bear. It will be noted that when said inner scraper is adjusted to its outermost position, as shown in the drawings, which is the position given it when the apparatus is new and unworn, the scraping edges extend outward beyond the outer edges of the disks and that they extend over the inner faces of the disks to an extent sufficient to operate upon those portions thereof which are most exposed to the soil, at the same time leaving a space between their inner ends and the scraping-ribs 9 on each side of the frame sufficient to permit the discharge downward of any material which may pass the scraper 10 and be arrested by the ribs 9. It will be further observed that this wedge-like inner scraper 10 bears upon the disks, on the sides thereof, about diametrically opposite the point at the front of the disks where their edges contact. As the disk-bearings wear through use and the disks become loose a downward or inward adjustment of the inner scraper 10 will bring its scraping edges again into proper relation with the inner faces of the disks and will at the same time serve to bring the forward edges of the disks together into contact and hold them in proper relation to each other as they rotate. The outer faces of the disks also require provision to be made for scraping the soil therefrom, particularly at their edges. To accomplish this, I employ resilient scrapers 17, one for each disk, each constructed and mounted in the following manner: Each scraper has a chisel-like scraping edge 18 at its rear lower end and extends thence upward and outward, diverging from the outer face of the disk at a considerable angle, its divergent portion being indicated by the reference-numeral 19. This divergent portion is connected to an intermediate portion 20, which lies above and extends across the upper edge of the disk, connecting the divergent portion 19 with the shank 21 of the scraper, which lies above and inward from the plane of the disk. This shank bears upon a suitable seat 22, formed on the side of the conduit 7, near the top thereof, and having, preferably, an abutment-flange 23 for the end of the scraper 17 and lateral abutment-flanges 24 to engage the lateral edges thereof. A bolt 25, mounted in the conduit 7, extends through an unthreaded aperture in the shank 21 of the scraper 17 and receives on its outwardly-projecting end a nut 26, which is preferably a square nut, although any polygonal form may be employed. From an inspection of Fig. 5 it will be seen that the scraper 17 is so constructed that its only bearings to resist the thrust of the nut 26 against it are at its extreme edges, the rear or lower edge, which is the cutting edge 18, bearing against the outer face of the disk, near the periphery thereof, while its upper or front edge (indicated by the reference-numeral 27) bears against the seat 22, the inner face of the shank contacting with the opposite face of the seat only at said edge. It results from this construction that the pressure with which the chisel-like scraper edge 18 of the scraper bears against the outer face of the disk may be readily adjusted by turning the nut 26 so as to cause said nut to bear with more or less pressure against the shank of the scraper. It will also be apparent from an inspection of Figs. 2 and 5 that any grass, stubble, or the like carried up by the disk which may pass between the disk and scraper 17, as sometimes occurs, will not become lodged between said scraper and its point of attachment, for the reason that ample space is provided for its passage by the divergence of the portion 19 from the face of the disk and for the further reason that the point of attachment of the scraper lies on the opposite side of the disk from that on which the scraper works. The nicety of adjustment of the pressure of the outside scrapers upon the disks obtained by the construction just described is of material importance in that it permits said scrapers to be so adjusted as to press against the disks with a pressure just sufficient to effectually scrape the same without pressing against them so hard as to resist by their frictional action the proper rotary motion of the disks, and thereby render the furrow-opener difficult to operate. Since the scraper-shank lies at an angle to the inner face of the nut and bears upon one edge thereof when the nut is turned so as to present said edge in the plane of the outer surface of the scraper-shank, said shank acts as a nut-lock to prevent accidental rotation of the nut, while permitting it to be turned when sufficient force is applied thereto. This action is most efficient when the nut is square, and I therefore prefer to employ a square nut.

Each disk is provided with a hub 28, which fits upon the corresponding trunnion 6, and said disks are held in position on the trunnions by a through-bolt 29, threaded at each end to receive a nut 30, which bears against a washer 31, which washer in turn bears against the end of the corresponding hub 28, as shown in detail in Fig. 10 of the drawings. It is usual to provide the hub with a terminal cap to cover and protect the end of the bolt 29 and its nut 30 and washer 31 and prevent the entry of dust or other detrimental material into the bearing. In order to provide such a cap which may be quickly applied and removed, which will be firmly held in position when in place, and which will present a smooth and uniform continuation of the body of the hub without any projection to engage and drag along grass, stubble, or other growths, I have devised the construction shown more particularly in Figs. 1, 2, 6, and 10. In this construction the hub is provided with a reduced terminal portion 32, thus forming a shoulder 33, and the cap (indicated by the reference-numeral 34) fits over this reduced portion and abuts against the shoulder 33. Said cap is of an external diameter equal to that of the hub where it joins the same, so that the body of the cap forms an extension of the body of the hub uniform and flush therewith, the hub and cap being cylindrical externally and the cap terminating in a spherical or rounded end portion 35. To secure the cap in position, a screw 36 is employed, threaded through an aperture in the cap and adapted to engage a recess 37 in the outer surface of the extension 32 of the hub. The screw 36 is of such length that when it is screwed home into engagement with the recess 37 its outer end is flush with the outer surface of the cap, so that no part projects in such a way as to be objectionable. By reason of this construction the entanglement of the device with grass or the like is avoided and the cap may be quickly applied and removed. The expense is also reduced to a minimum, since the cap may be cast ready for use without requiring any machine-finishing.

38 indicates an oil-duct by means of which the disk-bearings may be lubricated.

I do not wish to be understood as limiting myself strictly to the precise details of construction hereinbefore described, and shown in the accompanying drawings, as the same may obviously be modified without departing from the principle of my invention.

Having thus fully described my invention, what I claim as new, and desire to secure by Letters Patent, is—

1. In a double-disk drill, the combination, with forwardly-converging disks, of a conduit located between said disks and having the lower portions of its side walls omitted, substantially as described.

2. In a double-disk drill, the combination, with a supporting-frame, and forwardly-converging disks mounted thereon, of an upright conduit located between the disks, having the lower portions of its side walls omitted, and provided rearward of said cut-away portions with longitudinal ribs arranged to bear against the inner faces of the disks as scrapers, substantially as described.

3. In a double-disk drill, the combination, with a support, forwardly-converging disks mounted thereon, and an upright conduit located between the disks and having longitudinal ribs bearing against the inner faces of the disks as scrapers, of a scraper mounted on the support in the rear of the conduit and having scraping edges which bear against the inner faces of the disks along the outer portions of said faces, said scraping edges being discontinuous at their lower ends from the conduit-ribs, substantially as described.

4. In a disk drill, the combination, with a support, and a furrow-opening disk mounted thereon, of a scraper of resilient material having an edge bearing at one end on the disk, the said scraper having an edge bearing at its other end on the support, and a securing device bearing on said scraper between said edge bearings and on the opposite side therefrom, said securing device being adjustable to vary its pressure, substantially as described.

5. In a disk drill, the combination, with a support provided with a seat and a bolt located therein and having a nut, of a disk mounted on the support, and a scraper having a shank portion fitted in the seat and bearing at one end only on the face of the seat, the bolt passing through said shank portion and the nut bearing on the outer face of said shank portion, said scraper having an intermediate portion extending transversely to the plane of the disk, and a working portion bearing at one end against the outer face of the disk near the periphery thereof, and diverging thence from the face of the disk to its point of union with the intermediate portion, substantially as described.

In testimony whereof I affix my signature in presence of two witnesses.

CHARLES H. PELTON.

Witnesses:
J. J. WELTY,
IRVINE MILLER.